Patented May 7, 1935

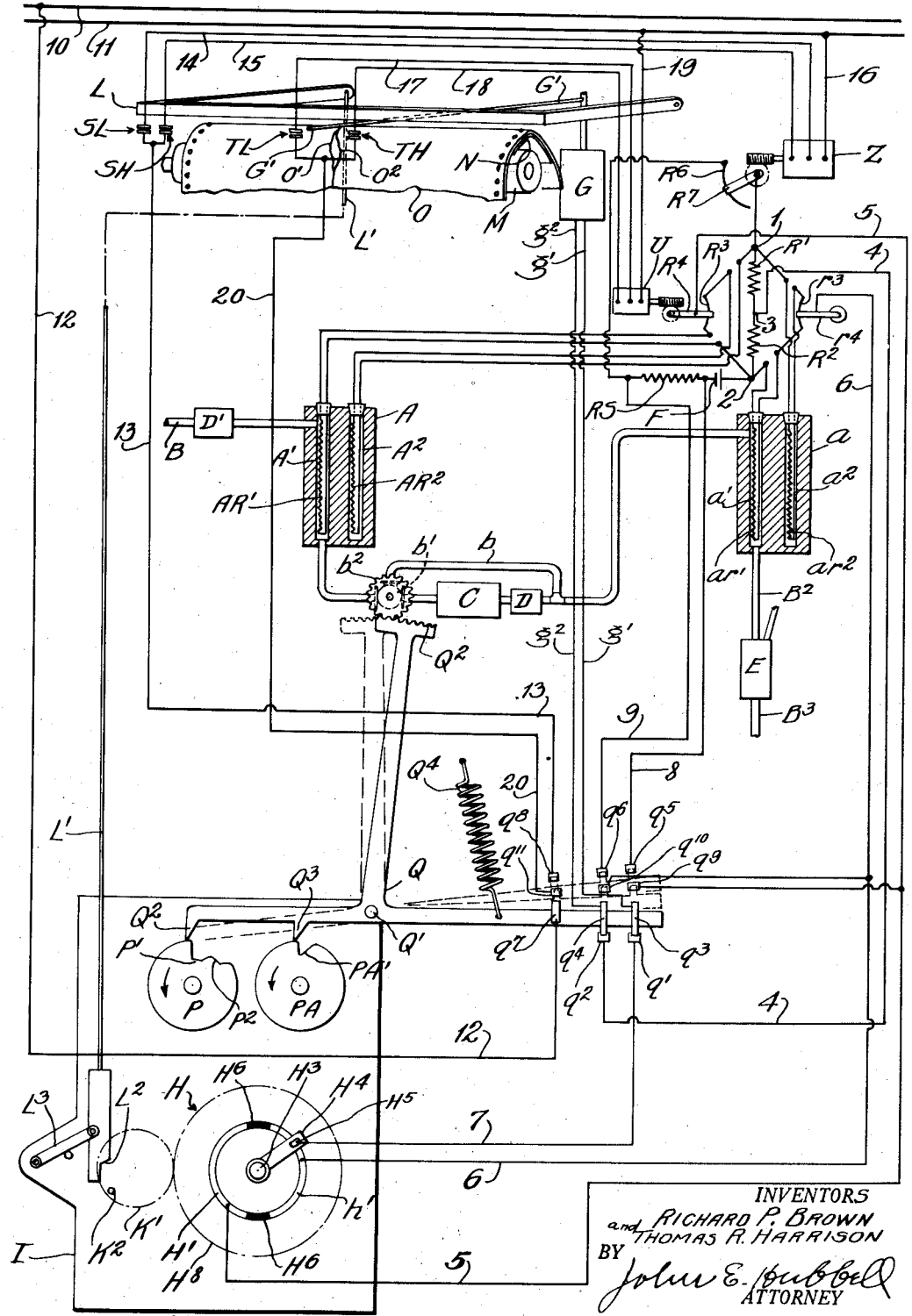

2,000,119

UNITED STATES PATENT OFFICE 2,000,119

APPARATUS FOR GAS ANALYSES

Richard P. Brown, Philadelphia, and Thomas R. Harrison, Wyncote, Pa., assignors to The Brown Instrument Company, Philadelphia, Pa., a corporation of Pennsylvania Application September 11, 1930, Serial No. 481,085

7 Claims. (Cl. 23—255)

The general object of the present invention is to provide an improved apparatus for gas analysis under conditions making it desirable to perform two successive gas analyses, one before and one after subjecting the gas to a treatment which does, or does not, make the results of one analysis differ from those of the other analysis, accordingly as the gas in its original condition does, or does not, include some constituent so modified by such treatment that it may be detected and measured by a comparison of the two analyses results.

While not necessarily restricted to such use, the invention was primarily devised, and is especially adapted for use in analyzing flue gas, such as that drawn from a boiler furnace. Such flue gas, under normal conditions of furnace operation, always contains a considerable, though varying, amount of carbon dioxide ($CO_2$). It may, or may not, contain a significant amount of unburned combustible constituents. In analyzing ordinary flue gas, it is frequently and indeed usually desirable to determine the $CO_2$ content, and also the unburned combustible content, if any, of the gas.

The methods and apparatus practically available and desirable for ordinary flue gas analysis, will directly determine the $CO_2$ content of the flue gas, but will not directly determine the unburned combustible content of the gas. To determine the latter it has been customary to first analyze the gas to directly determine its $CO_2$ content, then to burn the unburned combustible content, if any, in the gas which has been analyzed, and thereafter to subject the gas to a second analysis similar to the first. The second analysis will show a higher $CO_2$ content than the first analysis, if the gas originally contained a significant amount of any or all of the ordinary unburned combustible constituents which are carbon monoxide (CO), methane ($CH_4$) and hydrogen (H), and the difference between the results of the two analyses gives an indirect measure of the unburned combustible content, if any, of the gas analyzed.

Neither of the above mentioned first and second analyses ordinarily consists of a single analysis of a single gas sample. On the contrary, each such first and second analysis ordinarily is and must be a continuous analysis in the sense that it comprises a continuing series of analyses successively performed on gas samples successively withdrawn from the furnace or other source of gas being analyzed at such frequent intervals as to show how the composition of the gas from said source may vary from minute to minute, or from one to another fraction of a minute.

Such an analysis continuity may be secured in various ways. For example, the gas may pass in a continuous stream to gas analyzing devices each of which comprises means for measuring and indicating or recording at each instant the density, thermal conductivity or some other measurable characteristic of the gas from which the composition of the gas may be determined. Such gas continuity may also be secured by definitely separate analyses succeeding one another at suitably frequent intervals. For example, it is common practice to pass the gas continuously through the analyzing apparatus and to record the measurements therein made by a pinch-the-needle recording instrument. In such case, while the gas flow is continuous and the measurement of the characteristic may be continuous in a sense, the record of the analysis from which its results are actually determined, is a curve formed of a series of record impression dots made at definitely separate timed intervals which are determined by the frequency of pointer depression of the recording instrument.

In analyzing flue gas in accordance with the present invention, we follow the abovementioned practice of the prior art in subjecting the gas to successive analyses, and in burning any uncombustible constituents present in the gas when subjected to the first analysis, before subjecting the gas to a second analysis.

The present invention is distinguished from the prior art, however, in the manner of, and means provided for recalibrating the measuring apparatus at suitably frequent intervals so as to maintain a desirable accuracy in the relative values for measurement obtained in the two analyses. As those skilled in the art will understand, a given measurement error in either analysis not great enough to prevent the measurement from giving the significant indication of the quantity of $CO_2$ in the gas analyzed, may well be great enough to destroy the significance of a CO determination made by comparing that measurement with a second $CO_2$ analysis measurement not containing such an error, whereas if both measurements contained the same error, the CO determination would be approximately accurate. The foregoing condition arises from the fact that the absolute measurement values obtained in the two analyses are each ordinarily much greater than the difference between said values. Indeed in ordinary conditions of furnace operation, the unburned combustible will frequently not be great enough to create a measurable difference in the results of the two analyses when those results are free from error or contain the same error. For reasons hereinafter explained a frequent recalibration of commercial gas analysis apparatus employed to determine the CO of the gas by the above described procedure is practically essential to suitable accuracy in such determination.

When the two analyses measurements are made with the proper relative accuracy to insure a suitably accurate determination therefrom of the CO or unburned constituent of the gases, the result of the two analyses may advantageously be recorded on a single chart and in such absolute values, or units, that the curve constituting a record of one analysis will depart from, or will coincide with the curve record of the other analysis, accordingly as the composition of the gas is or is not varied by the treatment to which it is subjected after its first and before its second analysis.

In the preferred mode of carrying out the present invention, we employ a recording instrument including a single meter for alternately measuring the results of the two analyses and for recording the measurements on a single travelling record sheet, and utilize said meter in automatically recalibrating the apparatus at regular intervals to insure suitable accuracy in the relative values of the two sets of analyses measurements. The preferred apparatus devised by use for carrying out the invention also comprises provisions for automatically regulating the strength of the energizing current for the Wheatstone bridge or analogous measuring circuit employed in effecting the analyses measurements.

While the general principles of the present invention may be utilized in, and some of its major advantages may be obtained with other forms of gas analysis apparatus, our present invention is especially adapted for use with apparatus for determining the composition of the gas by measuring its thermal conductivity, and our invention includes improvements pertaining specifically to apparatus for measuring gas thermal conductivity.

The various features of novelty which characterize our invention are pointed out with particularity in the claims annexed to and forming a part of this specification. For a better understanding of the invention, however, and the advantages possessed by it reference should be had to the accompanying drawing and the following descriptive matter.

The one figure of the drawing is a diagrammatic representation of a preferred type of apparatus constructed in accordance with, and for use in carrying out the present invention.

Mounted in the cells $A'$, $A^2$, $a'$ and $a^2$ are resistors $AR'$ $AR^2$, $ar'$ and $ar^2$. The resistors $AR'$ and $AR^2$ are connected in series with one another between junction points 1 and 2 of a measuring circuit. The resistors $ar'$ and $ar^2$ are similarly connected in series between said junction points 1 and 2, and fixed resistances $R'$ and $R^2$ are also connected in series with one another between the points 1 and 2. The said measuring circuit is energized by current supplied by a battery or current source F having its terminals connected to said points 1 and 2. In separately measuring the thermal conductivities of the gases passing through the cells $A'$ and $a'$ the resistors $AR'$ and $AR^2$ may be regarded as included in two arms of one Wheatstone bridge, while the resistors $ar'$ and $ar^2$ are included in two arms of another Wheatstone bridge, the resistances $R'$ and $R^2$ forming the ratio arms of each of said bridges. In the calibrating operations hereinafter described by which said two bridges are kept in balance, the resistors $AR'$ $AR^2$ $ar'$ and $ar^2$ may be regarded as included in the different arms of a single Wheatstone bridge having its energization points 1 and 2 connected by a shunt including the resistances $R'$ and $R^2$.

The junction point of the two bridge arms including the resistors $AR'$ and $AR^2$ is formed by a contact $R^4$, which is adjustable along a bridge calibrating slide wire resistance $R^3$ connecting one end of the resistance $AR'$ to one end of the resistance $AR^2$. The junction point between the bridge arms including the resistance $ar'$ and $ar^2$, is similarly formed by a contact $r^4$ adjustable along a bridge calibrating slide wire resistance $r^3$, which connects one end of the resistor $ar'$ to one end of the resistor $ar^2$. The battery, or other source of bridge energizing current F is connected between the bridge junction points 1 and 2 in series with a fixed resistance RS, more or less of the slide wire resistance $R^6$ of an automatic rheostat actuated by a motor Z, and the switch arm $R^7$ of that rheostat.

As those skilled in the art will understand, the potential difference between the bridge junction point 3 at which the resistances $R'$ and $R^2$ are connected, and the junction point formed by the contact $R^4$ at which the resistors $AR'$ and $AR^2$ are connected, constitutes a measure of the thermal conductivity of the test gas passing through the cell $A'$ and thereby gives an indication of the composition of that gas. Similarly, the potential difference between the bridge junction points 3 and $r^4$ measures the thermal conductivity and indicates the composition of the gas passing through the test cell $a'$. The apparatus shown in the drawing comprises means normally operative to connect bridge junction points $R^4$ and 3 at regular intervals to the terminals $g'$ and $g^2$ of a galvanometer G, and at other intervals, alternating with the first mentioned intervals, to connect the junction points $r^4$ and 3 to the galvanometer terminals $g'$ and $g^2$.

As diagrammatically illustrated, the means for thus alternately connecting the two sets of bridge junctions to the galvanometer G comprise a conductor 4 running from the common bridge junction point 3 to a stationary switch contact $q^2$, and means including an automatic transfer switch H and conductors 5, 6 and 7 for alternately connecting a co-operating stationary switch contact $q'$ to the bridge junctions $R^4$ and $r^4$. To this end the junction contacts $R^4$ and $r^4$ are connected by conductors 5 and 6, respectively, to stationary contacts $H'$ and $h'$, respectively, of the switch H. The latter includes a continuously revolving shaft $H^3$ carrying a contact arm $H^4$ on which is mounted a brush $H^5$. The contacts $H'$ and $h'$ are shown as segments, each of slightly less than 180 degrees, of the same annulus formed in part by those contacts, and in part by the insulation $H^6$ between the abutting ends of the contacts. The brush $H^5$ is connected to said contact $q'$ by the conductor 7. As the shaft $H^3$ revolves, the brush $H^5$ alternately engages the contacts $H'$ and $h'$ thus alternately connects the junction contacts $R^4$ and $r^4$ to the contact $q^2$. The contacts $q'$ and $q^2$ are normally engaged by movable contacts $q^3$ and $q^4$, to which the galvanometer terminals $g'$ and $g^2$ are connected.

The shaft $H^3$ of the automatic transfer switch H is revolved at a suitable speed for example, two revolutions or so per minute, by a suitable timing motor mechanism I, which may well include a so-called electric clock as its driving motor. The mechanism I, as diagrammatically shown, also actuates a depressor L which periodically engages the galvanometer pointer $G'$ and depresses the latter to make a record impression on a travelling record sheet or strip O. The mechanism for advancing the record sheet, for periodically depressing the pointer $G'$, and for producing a record impression when the pointer is depressed, may be of any usual and suitable type. The mechanism shown is of the type disclosed in the Brown Patent No. 1,564,518, granted December 8, 1925.

In the apparatus shown herein, as in said prior patent, the record strip O is continuously advanced by a slowly revolving record feed roll M, and a straight edge member N is interposed between the top of the roll and the record strip so that when the pointer is depressed the record sheet is compressed between the straight edge and the pointer. The transfer ribbon shown in said prior patent as interposed between the pointer and the record strip, is not illustrated herein as such illustration seems unnecessary. As in said prior patent, the depressor element L has a gravital tendency to engage the pointer $G'$, but is normally held in an elevated position above the pointer, by a weighted connecting rod $L'$, which is periodically lifted to permit the depressor L to turn under the action of gravity into depressing engagement with the pointer.

The means shown for periodically lifting the connecting rod $L'$ comprises a gear wheel $K'$ continuously rotated by the mechanism I, and carrying a crank pin $K^2$ which engages and raises a shoulder $L^2$ on the connecting rod $L'$ once during each revolution of the gear $K'$. As shown, the lower end of the rod $L'$ is guided by a link $L^3$ which is pivoted at one end to the connecting rod $L'$ and is pivoted at its other end to the housing for the mechanism I. As shown, the gear $K'$ is in mesh with a gear $H^3$ secured to the transfer switch shaft $H^3$, and the two gears are so proportioned that the gear $K'$ makes two revolutions for each revolution of the shaft $H^3$.

In the use of the apparatus so far described, in determining the composition of ordinary flue gas such as that drawn from a boiler furnace, the potential difference between the Wheatstone bridge points $R^4$ and 3 will vary in quite definite accordance with variations in the $CO_2$ content of the gas passing through the chamber $A'$, since the thermal conductivity of carbon dioxide is lower than that of air, whereas ordinary flue gas, except for its $CO_2$ content, has approximately the same thermal conductivity as air. In consequence, the record curve $O'$ formed by the impressions made on the record sheet by the galvanometer pointer $G'$ during the periods in which the galvanometer G is connected to the junction points $R^4$ and 3, constitutes a record of the $CO_2$ content of the flue gas. The record $O^2$ formed by the record impressions produced when the galvanometer G has its terminals connected to the junction points $r^4$ and 3 of the Wheatstone bridge associated with the analyzing device $a$, constitutes a record of the thermal conductivity of the gas after passing through the gas treating device C.

The devices A and $a$ and the associated measuring means are advantageously so calibrated that when the thermal conductivity of the gas is unchanged by its passage through the device C, the record curves $O^2$ and $O'$ will coincide or unite to form a single curve. With the apparatus so calibrated, any divergence between the two curves $O'$ and $O^2$ forms a sharp and easily read record of the effect of the device C on the composition of the gas passing through it.

When the device C is an oxidizing furnace, it operates to burn the unburnt combustible constituents of the flue gas coming to the furnace C. The only products of combustion of practical significance in this connection which are formed by burning the combustible constituents found in ordinary flue gas are carbon dioxide and water vapor, the latter resulting from the combustion of hydrogen. The $CO_2$ and the water vapor produced in the device C, each lower the thermal conductivity of the gas passing through the cell $a'$ below that of the gas passing through the cell $A'$. Each of those products tends therefore to make the record $O^2$ indicate a higher $CO_2$ content than is indicated by the record $O'$. The production of the $CO_2$ does this by directly increasing the $CO_2$ of the gas passing through the device C. The water vapor produced in the device C so effects the relations of the records $O'$ and $O^2$, because it results from the combustion of hydrogen, which has raised the thermal conductivity of the gas in the cell $A'$ and has made the record $O'$ indicate a smaller $CO_2$ percentage than would have been indicated if the gas passing through the cell $A'$ had not contained such hydrogen. The water vapor formed by the combustion of the hydrogen in the device C is eliminated in the conditioning device D and does not enter the cell $a'$, and has no effect on the record $O^2$.

Whatever the cause may be for changes in relative values of the quantity represented by the curves $O'$ and $O^2$, the production of those curves in such form that they coincide when the furnace or other gas treating device does not produce a significant change in the gas composition, and diverge only when such change is produced, provides a record of the said change which is strikingly apparent on inspection of the record sheet. Furthermore, such record of the change may be interpreted more readily and ordinarily will be interpreted more accurately than would be practically possible if the curves $O'$ and $O^2$ were laterally displaced from one another on the record chart for all normal values respectively shown by those curves.

In order that the curves $O'$ and $O^2$ may coincide when the conditions are such that the device C makes no significant change in the composition of the gas flowing through it, it is essential that the apparatus be calibrated to insure suitable accuracy in the relative values of the quantities shown by two curves. With the particular form of measuring apparatus herein disclosed, this requires that the bridge circuits be balanced in the sense that the resistance ratio of the bridge arms including the resistors $AR'$ and $AR^2$, respectively, shall be equal or at least very nearly equal to the resistance ratio of the bridge arms including the resistors $ar'$ and $ar^2$, respectively. From a superficial consideration of the matter, it might seem that if the contacts $R^4$ and $r^4$ were once properly adjusted to secure equality of such resistance ratios, such equality would be maintained until one or both of said contacts were readjusted. It is not possible, however, with ordinary commercial methods of manufacture and assembly, to so construct and assemble the gas analysis cells and their resistors that variations in the temperature coefficients of the different cells resistors will not occur in the normal operation of the apparatus. In consequence, with the apparatus of the form illustrated, readjustments of one of said contacts $R^4$ and $r^4$ relative to the other must be made from time to time to avoid an objectionable departure from equality of the two above mentioned resistance ratios.

The same causes which make readjustment of the relative positions of the contacts $R^4$ and $r^4$ necessary to maintain equality in the above mentioned resistance ratios require adjustment from time to time of such contacts to avoid objectionable errors in the separate $CO_2$ and $CO$ measurements. It is also important that the bridge energizing current should be maintained at approximately constant value.

In accordance with the present invention, the contact $R^4$ is automatically adjusted from time to time as required to maintain a suitably close approximation to equality between the resistance ratio of the resistors $AR'$ and $AR^2$ and the resistance ratio of the resistors of the bridge arms including the resistors $ar'$ and $ar^2$. By thus adjusting the contact $R^4$, its position relative to the contact $r^4$ is made such as to insure a suitable accuracy in the relative values of the thermal conductivity measurements of the gases passing through cells $A'$ and $a'$, respectively, to insure the proper relation between the curves $O'$ and $O^2$.

In the contemplated use of the apparatus shown in the drawing, the contact $r^4$ is manually adjusted from time to time to insure the desired accuracy of measurements of the thermal conductivity of the gas passing through the cell $a'$. The necessity for and extent of such adjustment of the contact $r^4$ may advantageously be determined by comparing the readings obtained by the meter G when connected to the bridge junction points 3 and $r^4$, with the results of an analysis of the gas then passing through the cell $a'$ made with an Orsat or other gas analysis apparatus suitably accurate for such calibration purposes. With the contact $r^4$ adjusted to secure suitable accuracy in the absolute values of the thermal conductivity measurements made in the cell $a'$, the above described automatic bridge balancing adjustments of the contact $R^4$ insure a similar accuracy in the absolute thermal conductivity measurements of the gas passing through the cell $A'$. In accordance with the present invention also, a portion of the mechanism for automatically adjusting the contact $R^4$ is combined with means for periodically adjusting the bridge energizing current to its proper value.

With the form of apparatus shown in the accompanying drawing, the above described automatic recalibrating operations are effected at regular intervals in the following manner and order: A transfer valve $b'$ is periodically adjusted to temporarily divert the gas flow from the gas treating device C and conditioning device D, into a pipe $b$ forming a by-pass about those devices. The strength of the bridge energizing current is then measured and the rheostat arm $R^7$ is adjusted as may be required to give the proper value to said current. A determination is next made as to whether or not there is a potential difference between the bridge junction points $R^4$ and $r^4$, and if such a potential difference is found, the junction point contact $r^4$ is adjusted to eliminate or suitably minimize such potential difference. As those skilled in the art will understand no such potential difference will then be found unless the resistance ratio of the bridge arms including the resistors $AR'$ and $AR^2$ is unequal the resistance ratio of the bridge arms including the resistors $ar'$ and $ar^2$, since with the devices C and D rendered inoperative by the by-pass $b$, gas of the same composition will then flow through the cells $A'$ and $a'$.

The means shown for carrying out the procedure referred to in the previous paragraph, includes a periodically actuated member Q which at suitably frequent intervals, for example, once an hour is moved to divert the gas flow from the devices C and D into the by-pass $b$, and while the gas flow is so diverted, first connects the meter terminal $g'$ and $g^2$ to the ends of the resistance RS in order that the meter G may measure the potential drop in said resistance and thereby measure the strength of the bridge energizing circuit. While the member Q connects the meter terminals to the terminals of the resistance RS, it also energizes control circuits through which the deflection of the meter pointer $G'$ energizes the motor Z so that the latter will adjust the proper adjustment of the rheostat switch arm $R^7$ along the rheostat resistance arm $R^6$ and thus bring the bridge energizing current to its proper value.

The member Q next connects the terminals $g'$ and $g^2$ of the meter to the bridge junctions $R^4$ and $r^4$ so that the meter G may then measure the potential difference, if any, between said points. While the meter is thus connected to the bridge junctions $R^4$ and $r^4$, the member Q energizes control circuits through which the meter pointer $G'$ energizes a motor U as required to effect any necessary adjustment of the contact $R^4$ along the slide wire $R^3$.

The member Q is shown as in the form of a three-arm lever pivoted at $Q'$. Except during recalibration periods the member Q is held in the position shown in full lines in the drawing, by the coaction of a spring $Q^4$, detents $Q^2$ and $Q^3$, and notched discs of cams P and PA. The latter are rotated by the timing motor mechanism I at such different speeds that the disc P makes a plurality of revolutions for each revolution of the disc PA. For example, the disc PA may make one revolution in an hour, while the disc P may make one revolution in ten minutes. The spring $Q^4$ tends to turn the lever O in the counter-clockwise direction from the full line position into the upper dotted line position shown in the drawing. Such movement is prevented by the engagement of the detent $Q^2$ with the un-notched portion of the periphery of the disc P, and by the engagement of the detent $Q^3$ with the un-notched portion of the periphery of the disc PA, but is permitted when the positions of the discs P and PA are such that the toothed detent $Q^2$ can enter the notch $P'$ of the disc P and the detent $Q^3$ can simultaneously enter the notch $PA'$ of the disc PA. This occurs once for each revolution of the more slowly moving disc PA when the latter is provided with a single notch $PA'$ as shown.

The notch $P'$ of the cam disc P comprises a deep portion initially entered by the detent $Q^2$ and a shallower following portion. When continued rotation of the cam P causes the detent $Q^2$ to ride up on the raised bottom wall portion $P^2$ of the shallower portion notch $P'$, the lever Q is moved into the intermediate dotted line position shown. The different portions of the notch P' are so proportioned as to hold the lever Q in each of its two dotted line positions long enough for the measuring and controlling operations respectively effected while the member Q is in said positions.

While the frequency of the movements of the member Q away from its full line position into its upper dotted line position under the action of the spring $Q^4$ is controlled by the slowly moving disc PA, the more rapidly moving disc P controls the return of the member Q from its dotted into its full line position shown and determines the length of the intervals during which the member Q remains in each dotted line position. Merely by way of example, it is noted that if the disc P makes one revolution in ten minutes and if the mouth of the notch P' corresponds to an arc of 36 degrees, the time interval between the movements of the member Q away from and back into its full line position will be one minute, which ordinarily will be sufficient for the various calibrating operations then effected.

The movement of the member Q out of its full upper line position adjusts the by-pass valve $b'$ to divert the gas flow from the devices C and D into the by-pass pipe $b$, by virtue of the fact that the spindle of the valve $b'$ carries a spur gear $b^2$ in mesh with the teeth of a segmental gear $Q^2$ carried by one arm of the lever member Q. When the latter is returned to its full line position, the gears $b^2$ and $Q^2$ adjust the valve $b'$ back into the position in which it interrupts gas flow through the by-pass pipe $b$ and permits gas flow through the devices C and D. The parts are so proportioned and arranged that the by-pass will remain open on the return of the member Q from its upper to its intermediate dotted line position.

The previously mentioned movable contacts $q^3$ and $q^4$ are carried by the member Q, and when the latter is shifted into its upper dotted line position, the contacts $q^3$ and $q^4$ are moved out of engagement with the contacts $q'$ and $q^2$ and into engagement with the contacts $q^5$ and $q^6$, respectively. The last mentioned contacts are connected by conductors 8 and 9, respectively, to the terminals of the fixed resistance RS in series with the bridge energizing current source F. In consequence, the meter G then measures the potential drop through the resistance RS, and thereby the strength of the bridge energizing current. If the latter is below its predetermined value, the pointer G' will be deflected into position in which when depressed by the depressor L it will effect the closure of a pair of suitably located control contacts SL. Should the energizing circuit exceed its predetermined value, the pointer G' when depressed will similarly close another pair of control contacts SH.

When the lever Q is in its upper dotted line position, one of the contacts SL and one of the controls SH are energized by their connection to a supply conductor 16 through a conductor 13, a contact $q^7$ carried by the member Q, a stationary contact $q^8$ then engaged by the contact $q^7$, and a conductor 12. The second contact SL is connected by a conductor 14 to one terminal of the motor Z, which has a second terminal connected by a conductor 15 to the second contact SH, and a third terminal connected by a conductor 16 to the supply conductor 11. When, with the member Q in its upper dotted line position, the contacts SL are closed, the motor Z is energized from the supply conductors 10 and 11 through an energizing circuit including the conductor 14, so to adjust the rheostat arm $R^7$ in the direction required to diminish the amount of resistance $R^6$ in the bridge energizing circuit, and thus increase the strength of the bridge energizing current. Conversely, the closure of the contacts SH with the member Q in its upper dotted line position establishes a motor energizing circuit including the conductor 15 which causes the motor Z to adjust the rheostat arm $R^7$ in the direction to increase the resistance $R^6$ in the bridge energizing circuit, and thus reduce the bridge energizing current.

When the member Q is moved into its intermediate position, the contacts $q^3$ and $q^4$ are moved out of engagement with the contacts $q^5$ and $q^6$, and into engagement with stationary contacts $q^9$ and $q^{10}$, respectively. At the same time, the contact $q^7$ is moved out of engagement with the contact $q^8$ and into engagement with the stationary contact $q^{11}$. The contacts $q^9$ and $q^{10}$ are connected to the conductors 5 and 6, respectively. In consequence, the engagement of the contacts $q^3$ and $q^4$ with the contacts $q^9$ and $q^{10}$, connects the terminals $g'$ and $g^2$ of the meter G to the bridge junctions $R^4$ and $r^4$. The meter pointer G' will then be in its neutral or natural zero position, or at one side or the other of the latter, accordingly as the bridge circuits to which the contacts $R^4$ and $r^4$ respectively pertain are balanced, or are unbalanced in one direction or the other. If unbalanced in one direction, the pointer G' will then lie above, and when depressed will close a pair of suitably located contacts TL, and if unbalanced in the other direction, the pointer will lie above, and when depressed will close two other suitably located contacts TH. The closure of either pair of contacts will effect a corresponding energization of the relay motor U and a corresponding adjustment of the contact $R^4$ along the resistance $R^3$, to thereby bring the two bridge circuits into exact, or approximate balance.

The control provisions for the motor U may be, and are shown as similar to those for the motor Z. When the contact $q^7$ engages the contact $q^{11}$, one contact TL and one contact TY is energized by their connection to the supply conductor 10 through the conductor 12, contacts $q^7$ and $q^{11}$ and conductor 20. One contact TL is connected to one terminal of the motor U by a conductor 17, and one contact TH is connected to another terminal of the motor U by conductor 18. The third terminal of the motor U is connected to the supply conductor 11 by a conductor 19.

Advantageously, each calibration period during which the member Q occupies either of its dotted line positions is long enough to permit a plurality of adjustments of the corresponding switch arm $R^7$ or contact $R^4$, if such plurality of adjustments is necessary to bring the galvanometer pointer into its then normal position.

The measuring system of this invention is applicable to other uses than the measurement of CO content of flue gas. By employing an absorbing device such as a KOH bath in place of the burner C the $CO_2$ contained in a gas under test may be removed and the resulting measurement caused to exhibit the $CO_2$ content of the gas. This system is also applicable to the measurement of $SO_2$ in the $SO_3$ vapor of a sulphuric acid manufacturing plant. The percentage of $SO_2$ is usually extremely small so that the greater accuracy of the measuring system of this invention enhances its usefulness in such applications. The $SO_2$ may be absorbed by a hydroxide solution or may be washed out in a washing tower. In general gaseous constituents of low solubility in water are most readily removed by absorbing the constituents by a chemical reaction while gases of high solubility in water are most readily removed by washing. Where either absorbing or washing of the test gas is practised the gas may be conditioned to a predetermined moisture content, prior to passing the gas to the measuring cell.

The measuring system of this invention may be used to measure gaseous constituents present in large percentage although the accuracy of this measuring method is greater than is usually necessary in such cases. The measuring method and system of this invention is particularly applicable for measuring a constituent present in such small quantity as not to permit of accurate measurement by ordinary thermal conductivity methods and apparatus.

While in accordance with the provisions of the statutes, we have illustrated and described herein the best form of embodiment of the present invention now known to us it will be apparent to those skilled in the art, as we have previously indicated, that other forms of apparatus may be employed in practicing the present invention. As those skilled in the art will understand also, some features of the present invention may be used to advantage in some cases without a corresponding use of other features.

Having now described our invention, what we claim as new and desire to secure by Letters Patent, is:

1. Apparatus for gas analysis comprising two gas analyzing devices, burning means for burning unconsumed combustible constituents of the gas, means normally operative to pass the gas first through one of said devices, then through said burning means and then the other device, measuring means including elements individual to each of said devices and a common measuring instrument adapted to be interchangeably connected therewith, a by-pass about said burning means, periodically operating means connecting said measuring instrument to the elements individual to each of said devices at alternate intervals to separately measure the operative results of said devices and, at less frequent intervals, to divert the gas flow away from said burning means into said by-pass and to connect said instrument and elements to measure any unbalance in the operative results of said devices, and means controlled by said instrument at said less frequent intervals for effecting corrective adjustments of said mechanism tending to eliminate such unbalance.

2. Apparatus for gas analysis comprising two thermal conductivity measuring devices each comprising a test gas cell and a standard gas cell and a resistor in each cell, burning means for burning unconsumed combustible gas constituents, means normally operative to pass gas successively first through the test gas cell of one of said devices, then through said burning means and then through the test gas cell of the other device, a measuring circuit comprising a Wheatstone bridge including in different arms the two cell resistors of one of said devices, and a second Wheatstone bridge including in different arms the two resistors of the other of said devices, a recording instrument, means normally effective to connect said instrument at intervals to one, and at intervening intervals, to the other of two Wheatstone bridges, means for by passing the gas passing from said one device to the other around said burning means at intervals less frequent than the first mentioned intervals, and means responsive to lack of balance, if any, in said bridges when the gas flow is so diverted, for effecting bridge adjustments tending to restore said balance.

3. Apparatus for gas analysis comprising two thermal conductivity measuring devices each comprising a test gas cell and a standard gas cell and a resistor in each cell, burning means for burning unconsumed combustible gas constituents, means normally operative to pass gas successively first through the test gas cell of one of said devices, then through said burning means and then through the test gas cell of the other device, a measuring circuit comprising a Wheatstone bridge including in different arms the two cell resistors of one of said devices, and a second Wheatstone bridge including in different arms the two resistors of the other of said devices, a recording instrument, means normally effective to connect said instrument at intervals to one, and at intervening intervals, to the other of the two Wheatstone bridges, a by-pass valve operative to divert the gas passing from said one device to the other away from said burning means, switching means for connecting said bridges and instrument so that the latter will respond to unbalance, if any, in said bridges while the gas flow is so diverted, means operating automatically at intervals less frequent than the previously mentioned intervals for operating said valve and switching means, and means controlled by said instrument for effecting bridge adjustments tending to restore bridge balance during the last mentioned intervals.

4. Apparatus for gas analysis comprising two thermal conductivity measuring devices each comprising a test gas cell and a standard gas cell and a resistor in each cell, burning means for burning unconsumed combustible gas constituents, means normally operative to pass gas successively first through the test gas cell of one of said devices, then through said burning means and then through the test gas cell of the other device, a measuring circuit comprising a Wheatstone bridge including in different arms the two cell resistors of one of said devices, a second Wheatstone bridge including in different arms the two resistors of the other of said devices, an energizing bridge circuit in which the two bridges are connected in multiple, a recording instrument, means normally effective to connect said instrument at intervals to one, and at intervening intervals, to the other of two Wheatstone bridges, by-pass means for diverting the gas passages from said one device to the other away from said burning means, switching means for simultaneously connecting said instrument to both bridges to respond to unbalance in said bridges, means automatically operating said by-pass and switching means at intervals less frequent than the first mentioned intervals, and means controlled by said instrument when so connected to both bridges for effecting bridge adjustments tending to eliminate such unbalance.

5. A Wheatstone bridge measuring circuit comprising a bridge energizing source of current and three pairs of bridge arms connected in multiple with one another to said source, the two arms of one pair being of fixed resistance value and the relative resistances of the two arms of each other pair being variable, mechanism normally operative to successively measure the potential differences between the junction of the arms of fixed resistance and the junction of the arms of first one and then the other of the other two pairs of arms at regular intervals, and means operative at less frequent intervals for measuring the potential difference between the last mentioned two junctions and adjusting the said circuit to minimize the last mentioned potential difference.

6. A Wheatstone bridge measuring circuit comprising a bridge energizing source of current and three pairs of bridge arms connected in multiple with one another to said source, the two arms of one pair being of fixed resistance value and the relative resistances of the two arms of each other pair being variable, a calibrating device means associated with each of the last mentioned pairs of arms, mechanism normally operative to successively measure the potential differences between the junction of the arms of fixed resistance and the junction between the arms of first one and then the other two pairs of arms at regular intervals, and means operative at less frequent intervals for measuring the potential difference between the last mentioned two bridge junctions, and adjusting one of said devices to thereby minimize the last mentioned potential difference.

7. Gas analysis apparatus comprising in combination an initial test gas chamber, a second test gas chamber, each of said chambers having an inlet and an outlet, conduit means for passing gas from the outlet of said initial chamber to the inlet of said second chamber and including means normally operable to alter the composition of the gas in its passage between said chambers, and a measuring system which includes means associated with said initial chamber and responsive to the composition of the gas therein, means associated with said second chamber and responsive to the composition of the gas therein, means for comparing the responses of the two last mentioned means to the composition of the gases in said chambers, normally inoperable calibrating means for automatically adjusting said system in accordance with variations in said responses and means periodically rendering the second mentioned means inoperative to change the composition of the gas passed between said chambers by said conduit means and for simultaneously rendering said calibrating means operative.

RICHARD P. BROWN.
THOMAS R. HARRISON.